United States Patent
Baglin et al.

(10) Patent No.: US 7,566,483 B2
(45) Date of Patent: Jul. 28, 2009

(54) PARTICLE IRRADIATION METHOD FOR MODIFICATION OF LOCAL STRAIN IN STRAIN REACTIVE STRUCTURES

(75) Inventors: John Edward Eric Baglin, Morgan Hill, CA (US); Richard D. Bunch, San Jose, CA (US); Linden James Crawforth, San Jose, CA (US); Eric W. Flint, San Jose, CA (US); Andrew J. Kellock, Sunnyvale, CA (US); Timothy Clark Reiley, Los Gatos, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 563 days.

(21) Appl. No.: 10/861,753

(22) Filed: Jun. 4, 2004

(65) Prior Publication Data

US 2004/0224092 A1 Nov. 11, 2004

Related U.S. Application Data

(62) Division of application No. 09/689,050, filed on Oct. 11, 2000, now Pat. No. 6,747,845.

(51) Int. Cl.
*C23C 14/48* (2006.01)
*C23C 14/04* (2006.01)
*B05D 5/00* (2006.01)
*G11B 5/60* (2006.01)
*C23C 14/58* (2006.01)

(52) U.S. Cl. .................. 427/526; 427/552; 427/595; 427/596; 360/234.3

(58) Field of Classification Search .................. None
See application file for complete search history.

(56) References Cited

U.S. PATENT DOCUMENTS

| | | | | |
|---|---|---|---|---|
| 4,476,152 A | * | 10/1984 | Imura et al. .................. 427/526 |
| 4,556,582 A | * | 12/1985 | Imura et al. .................. 427/523 |
| 4,701,385 A | * | 10/1987 | Imura et al. .................... 365/33 |
| 5,442,850 A | * | 8/1995 | Kerth ........................ 29/603.12 |
| 5,537,276 A | * | 7/1996 | Mukae et al. ............. 360/291.6 |
| 5,704,112 A | * | 1/1998 | Katase et al. ............. 29/603.12 |
| 5,709,112 A | | 1/1998 | Kennedy ...................... 70/177 |
| 5,724,211 A | * | 3/1998 | Higashiya et al. ......... 360/244.4 |
| 5,982,583 A | | 11/1999 | Strom ........................ 360/103 |
| 6,125,004 A | * | 9/2000 | Katase et al. ............. 360/234.3 |
| 6,321,440 B1 | * | 11/2001 | Crawforth et al. .......... 29/603.1 |
| 6,440,520 B1 | * | 8/2002 | Baglin et al. ............. 428/847.7 |
| 6,522,801 B1 | * | 2/2003 | Aksyuk et al. ................ 385/18 |
| 6,531,084 B1 | * | 3/2003 | Strom et al. ................ 264/400 |
| 6,555,182 B1 | * | 4/2003 | Tonosaki et al. ............ 427/525 |
| 6,776,690 B2 | * | 8/2004 | Bunch et al. ................. 451/29 |
| 6,929,721 B2 | * | 8/2005 | Bifano .................. 204/192.34 |

(Continued)

*Primary Examiner*—Marianne L. Padgett
(74) *Attorney, Agent, or Firm*—Duft Bornsen & Fishman LLP (57) ABSTRACT

Modified strain regions are created in correlation to strain reactive structures that are subjected to a predetermined dimensional precision adjustment. The modified strain regions are created by impacting incident particles into exposed regions of the strain reactive structures. The irradiation by the incident particles creates a predetermined material disruption and consequently a change in strain energy. The strain energy, and the associated dimensional adjustment is dependent on the irradiation process and the sum properties of the modified strain regions and the strain reactive structure.

12 Claims, 8 Drawing Sheets

U.S. PATENT DOCUMENTS

| | | | |
|---|---|---|---|
| 7,196,016 B2 * | 3/2007 | Buchan et al. | 438/712 |
| 7,372,690 B2 * | 5/2008 | Moffatt | 361/234 |
| 7,501,618 B2 * | 3/2009 | Park et al. | 250/251 |
| 2003/0053156 A1 * | 3/2003 | Satoh et al. | 358/511 |
| 2003/0138213 A1 * | 7/2003 | Jin et al. | 385/47 |
| 2007/0293020 A1 * | 12/2007 | Pressel et al. | 438/463 |

* cited by examiner

PARTICLE IRRADIATION METHOD FOR MODIFICATION OF LOCAL STRAIN IN STRAIN REACTIVE STRUCTURES

This patent application is a divisional of application Ser. No. 09/689,050, filed Oct. 11, 2000 now U.S. Pat. No. 6,747,845.

FIELD OF INVENTION

The invention generally relates to the field of surface and shape adjustment by differential strain inducement. In particular, the invention relates to the field of compressive strain inducement into a solid structure by disrupting its structural homogeneity at selected regions.

BACKGROUND OF THE INVENTION

Precision shape adjustment is a fabrication procedure with a particular need for ongoing improvement because of its use in the processing of numerous small, high-precision objects. Solid structures with a need for precision shape adjustment are for instance the sliders in hard disk drives. Sliders are manufactured to narrow dimensional tolerances, in particular at their air-bearing surface.

The air-bearing surface is designed to keep the magnetic recording head at a predetermined flying height above the rotating disk during its read and write operation. The flying height influences the achievable data storage density on the rotating disk. In order to increase storage density, the air-bearing surface must be designed to allow smaller and smaller flying heights.

The continuous miniaturization of sliders makes it increasingly more difficult to control their ever-tighter shape tolerances. Slider shape deficiencies that result from conventional manufacturing techniques become more critical for the operational performance of the slider on a disk, during contact start stop (CSS) and/or during slider load/unload operations.

Commonly, a lapping process is used that induces surface stress on selected regions or faces of the magnetic recording sliders and performs microscopic dimensional shape adjustment. The lapping process is typically carried out at the slider row level. Hence, it provides a very limited possibility to adjust individual magnetic recording heads. Further, the lapping process becomes more difficult to apply as the desired tolerances of the produced sliders become smaller.

The fabrication methods, used to create and smooth the microscopic air-bearing surface, typically generate flat, sharp edged features and contours. As an unfavorable result, air-bearing edges and corners, which occasionally come into contact with the disk, become more likely to penetrate lubrication and wear layers on the disk and scratch the magnetic layers of the hard disk. To address this problem, fabrication techniques are introduced at a late stage of the manufacturing process to induce a convex curvature to the air-bearing surface. This curvature prevents on one hand areal surface contact and stiction between the slider and the disk surface. On the other hand, the induced curvature reduces the risk of cutting or abrading the disc surface with the air-bearing surface during dynamic contact.

One fabrication technique used to induce surface curvature is known as scribing. It is described in the U.S. Pat. No. 5,704,112. The patent describes a method for mechanically forming grooves in the material on areas of the air-bearing surface. The grooves are preferably created by a diamond tip that is moved with a small load along a surface of the work piece. The description is indefinite as to how far the removal of material will enable bending of the slider by changing the stress induced on that side of the slider during its prior polishing. The use of a diamond tool with an edge angle of 120 degrees and a load of 100/150 gr is disclosed in FIGS. 9 and 10. It is known to those skilled in the art that the use of such a tool in combination with materials used for the manufacturing of sliders causes at least some plastic deformation together with the removal of material. The inducement of plastic deformation is the source of compressive strain in the area surrounding the grooves. To the contrary, column 4, line 47 and following describe in an embodiment alternative creation of the grooves as shown in FIG. 3. The use of many very different material removal techniques is listed without identifying their influence on creating compressive strain.

Mechanical scribing by the use of a diamond tool requires very high precision; it is time consuming and expensive for mass production. The application of adequate gram loads on the microscopic work pieces is also problematic, because it requires additional mechanical support for the work piece. Grooved surfaces have to be accessible for the diamond tool, which puts a limitation on the design of the air-bearing surface.

Another shortcoming of mechanical scribing is the unavoidable creation of microscopic debris. Microscopic debris makes additional cleaning operations necessary and further reduces the efficiency of this fabrication technique.

A method to thermally induce tensile stress for curvature adjustment of air-bearing surfaces is described in the U.S. Pat. No. 5,982,583. The patented method uses a laser beam to melt surface areas of the back face of the magnetic recording head. During the subsequent cooling process the melted material shrinks and induces a tensile strain energy on the back face, which bends concave. As a result, the whole structure of the magnetic recording head including the opposing air-bearing surface is deformed. This is a relatively expensive process, which requires individual slider measurement and repeated laser illumination. This process also produces debris, which must be cleaned from the sliders.

Therefore, there exists a need for a clean and efficient fabrication method that enables the formation of a curvature on a predetermined area of a solid structure like, for instance, an individual slider of a hard disk drive. The present invention addresses this need.

OBJECTS AND ADVANTAGES

It is an object of the present invention to provide a clean, efficient and non-destructive fabrication technique to controllably adjust the curvature of a predetermined area of a solid structure.

It is another object of the present invention to provide a fabrication technique for curvature adjustment of solid structures that is not limited by geometric and/or dimensional conditions of the work piece.

It is a further object of the present invention to provide a fabrication technique for curvature adjustment of solid structures that can be applied without causing a significant temperature rise of the work piece.

SUMMARY

Ion implantation is typically used to implant precisely controlled amounts of material at a particle destination within semiconductor materials. The reason for that is mainly to locally change electronic properties of the semiconductor material. Commercial tools and equipment are available to perform the particle implantation. The basic knowledge of particle irradiation within a solid has been developed and implemented in commercially available engineering software.

During particle implantation the kinetic energy applied to each of the particles dissipates along their deceleration path within the structure of the material. A portion of the particle energy is dissipated by causing displacements of atoms from their original positions in the solid, leaving vacancies in the solid structure. Atoms, which are directly hit by the moving particles along the deceleration path, may recoil out of their lattice positions if sufficient energy is transferred by the impact. The recoiling atoms themselves may have sufficient energy to cause other atoms to be displaced from their sites. This continues until all kinetic energy of the recoiling atoms is exhausted.

The atomic displacement takes place in regions called cascades. The cascade center, where the atomic displacement is initiated, is typically rich with vacancies since atoms were removed. This region is often surrounded by an interstitial-rich region, produced as the rapidly diffusing interstitials leave the cascade center. Vacancies themselves can diffuse too, but typically at a much lower rate. They are also frequently refilled by an atom ejected from a neighboring site.

In a crystalline lattice, a result of particle irradiation may be a disordered crystalline lattice within the cascade region, and accompanying compressive strain energy within the cascade volume. An increase in compressive strain energy is a well-known consequence of particle implantation in crystalline materials.

It is known to those skilled in the art that in some materials, such as silicate glasses, polymers and/or amorphous alloys, particle irradiation may cause compaction resulting in tensile strain.

In the present invention, the introduction of a controlled, local strain energy is intentionally cultivated to create a modified strain region embedded in a strain reactive structure. The modified strain region is embedded at a location of the strain reactive structure and features a size, shape and a strain energy that relate to the physical properties of the strain reactive structure. As a result, a predetermined deformation of the strain reactive structure is accomplished. The relevant physical properties of the strain reactive structure include, for instance, shape, size, modulus of elasticity, Poisson's ratio and yield stress.

Conventionally, the particle beam energy is chosen so that the principal strain occurs in a layer much closer to the surface of the material than to its reverse side, typically at a depth of a few microns. Hence, modified strain regions are created at a quasi surface location, where the altered strain can be utilized most efficiently to perform a predetermined deformation of the strain reactive structure. As a result, the processing particle energies remain at a manageable level. By limiting the mean particle current density to which the work piece is exposed, the thermal rise in the work piece can be kept low so that it does not impose any limitation in the industrial application of the method.

Even though particle implantation equipment is used in the inventive technique, the equipment is used to efficiently distort the solid structure by radiation damage, rather than to utilize it to induce chemical or electronic changes caused by the particles. Therefore, the invention is described as particle irradiation rather than particle implantation. Particle irradiation can be easily tailored to the specific needs of the work piece and/or the required dimensional precision adjustment. Non-contacting masks and/or lithographic masks may be used to restrict the particle beam to predetermined locations. A focused particle beam may be used to create the modified strain regions without any mask. Particle irradiation does not require specific surface geometries and/or extended accessibility such as are necessary for mechanical scribing as described in the background section.

Ion implantation is a clean technique with little associated debris and/or condensed vapors. This fact gains significance when the work piece becomes too small and sophisticated for reliable cleaning with a feasible effort.

During conventional particle implantation for semiconductor doping, particles of a required material must generally be placed in a solid structure with a minimal crystalline distortion, whereas particle irradiation utilizes particles with an optimized distortion characteristic to achieve a desired macroscopic distortion. Hence, for particle irradiation, the particles are mainly selected for their distortion properties on the work piece material following their impact. Appropriate particles are, for instance, Argon, Helium, Hydrogen, Boron, Nitrogen, Carbon, Oxygen and Neon in combination with Titanium carbide/Aluminum oxide material for the strain reactive structure. It is clear to one skilled in the art that any other particle types may be used to create strain regions in a broad range of other strain reactive materials.

The strain-inducing particle irradiation is primarily characterized by the particle element species, particle dose, particle energy and particle impact angle. The result is a specific strain energy and consequently a deformation of the work-piece.

In a simplified case, when the modified strain region uniformly covers an exposed surface, the achieved deformation curvature in a profile section is convex and is proportional to the thickness of the modified strain region and to the inverse of the second power of the material thickness.

The modified strain region may be embedded within a strain reactive structure of the same and/or different material. In such cases, the achieved deformation depends on the combination of the geometry and elastic properties of the modified strain region, the strain reactive structure and the embedding relation between them.

The present invention is preferably utilized to add and/or adjust a curvature of the air-bearing surface of magnetic recording heads. The particle irradiation is performed in a late stage of the manufacturing process after the heads are finished, and after most or all of the slider shaping is complete.

Metal and/or photoresist masks are used to protect sensitive areas against the irradiation. Masks may be used further to create the modified strain regions with predetermined areal shapes. The selection of specific areal shapes makes it possible to apply the curvature in a predetermined direction. The irradiation process itself may be applied sequentially on a number of cyclically exposed work pieces such that the particle beam power can be brought to a maximum without exceeding a critical thermal rise in each work piece. Thus, during the irradiation process, the beam power becomes averaged over many work pieces.

The irradiation beam may be repeatedly scanned onto the work pieces to accumulate the desired strain. Alternatively, the work pieces may be repeatedly moved into the irradiation beam for the same desired effect.

The particle irradiation may be used to perform a dimensional precision adjustment of many material structures, as for instance, for the adjustment of optical elements in opto-electronic devices and/or the tuning of cantilevers.

DETAILED DESCRIPTION

Although the following detailed description contains many specifics for the purpose of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
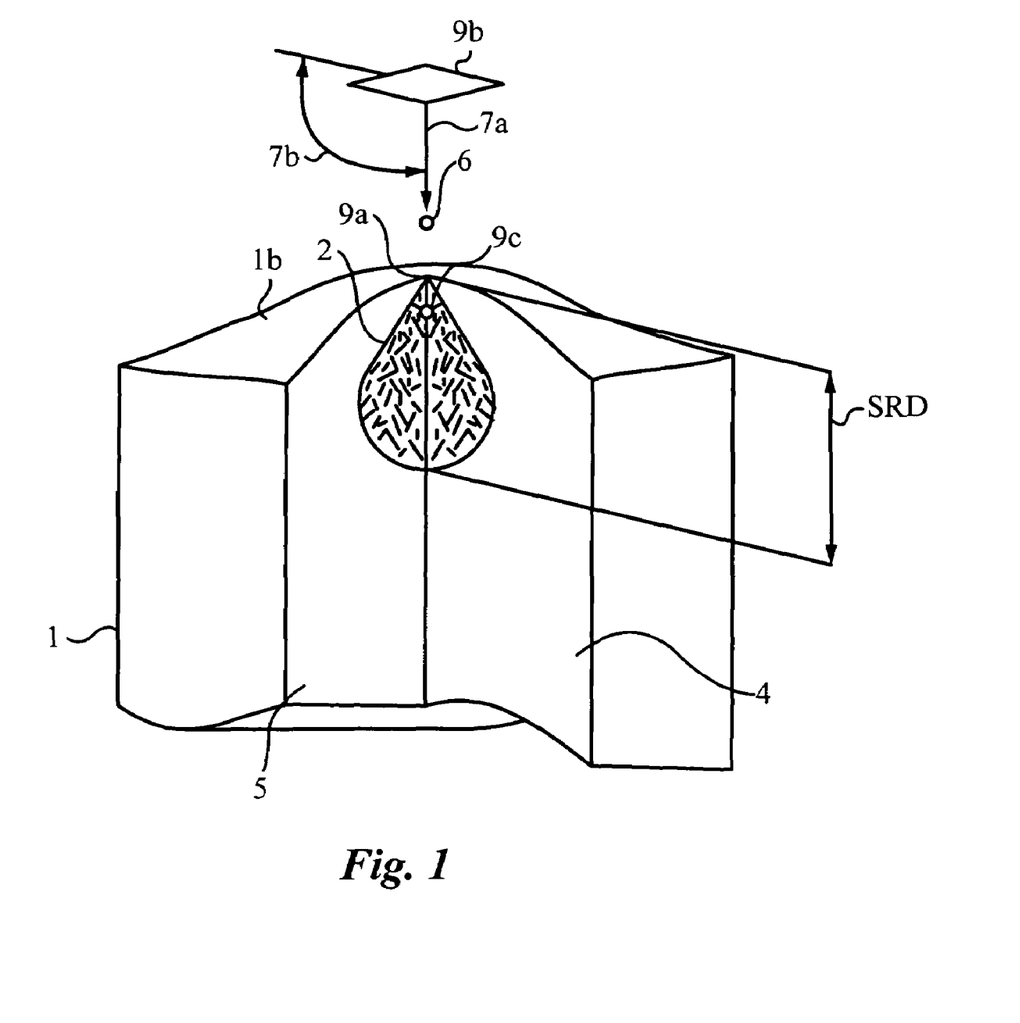
FIG. 1 shows a perspective cut view of a single particle cascade in a solid.

FIG. 1 shows the creation of a modified strain region 12, 34a-x (see FIGS. 2-10) by decreasing the crystalline perfection of a crystalline volume 1. FIG. 1 shows a single incident particle 6 moving towards a particle impact point 9a on the impact surface 1b of the crystalline volume 1. The single incident particle 6 is representative of the many particles, which arrive at random points on exposed surface of strain regions 12, 34 a-x (see FIGS. 2-5, 7-10) and which collectively cause the resulting damage, strain and distortion of the work piece.

The incident particle 6 has an impact velocity 7a at the particle impact point 9a. The impact velocity 7a has an impact direction defined by an impact angle 7b relative to an impact point plane 9b, which is parallel to a tangential plane (not shown) of the particle impact point 9a on the impact surface 1b.

The incident particle 6 has a kinetic energy at the particle impact point 9a that corresponds to the particle mass and the impact velocity shown with the impact velocity vector 7a. After the incident particle 6 enters the solid, its kinetic energy dissipates within the crystalline volume 1 along the deceleration path DCP. The deceleration path DCP is typically a crooked path contained within the region 2. When the kinetic energy is consumed, the incident particle 6 comes to rest at the final particle location 9c. The decelerating incident particle 6 collides along its deceleration path DCP with initial atoms of the crystalline volume 1 and depending on the impact parameter breaks some of them free. The initial atoms are given momentum by the collision and move away from the deceleration path DCP. They themselves collide with further atoms until the kinetic energy of each of the recoiling atoms is below a level that is necessary to break another atom free. Hence, the number of displacements within the cascade 2 is correlated to the kinetic energy of the impacting particle 6. The number of displacements within the cascade 2 is further correlated to its mass relative to that of the host atoms, and to its scattering probability in the cross section on the host atoms.

The displacement of atoms within the region 2 results in a reduction of the crystalline perfection. The incident particle 6 displays a particle collision characteristic along the deceleration path DCP that is dependent on the particle type and the material type of the crystalline volume 1 as it is known to those skilled in the art.

In FIG. 1, the crystalline volume 1 is cut open along the first cutting plane 4 and the second cutting plane 5. First and second cutting planes 4, 5 are perpendicular to each other and parallel to the impact velocity vector 7a. First and second cutting planes 4, 5 intersect along the impact velocity vector 7a. The deceleration path DCP may diverge in its orientation from the impact velocity vector 7a.

The region 2 is created essentially rotationally symmetric around the impact velocity vector 7a. The visible sections of the region 2 on first and second cutting planes 4, 5 represent the three-dimensional shape of the region 2.

The reduction of the crystalline homogeneity is further referred to as crystalline distortion. The crystalline distortion changes the physical properties of the material within the cascade 2. The main physical property change is a static expansion within the cascade 2. In the case, when the cascade 2 is in a strain transmitting connection with respect to strain reactive material, the static expansion is opposed and a compressive stress arises within the cascade 2.

The maximal depth SRD of the cascade region 2 for a given incident particle 6 and a given impact velocity vector 7a is dependent on the impact angle 7a. The cascade 2 is essentially rotationally symmetric relative to the impact velocity vector 7a.

Figure 2:
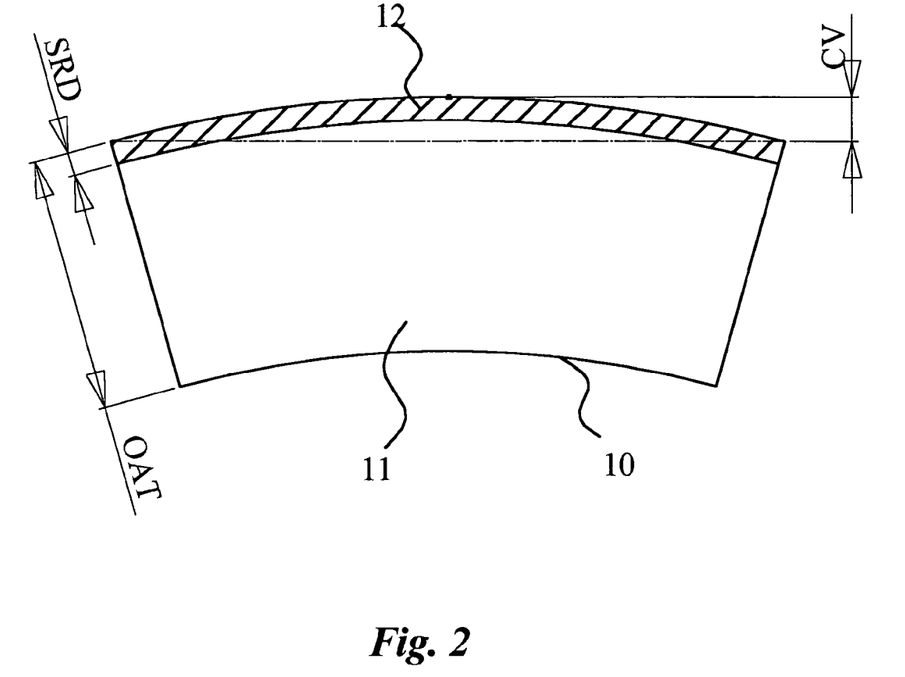
FIG. 2 shows a simplified cut view of a modified strain region on top of a strain reactive structure.

FIG. 2 shows a work piece 10 with a modified strain region 12 and a strain reactive structure 11. The work piece 10 is from a material with a homogenous solid structure and is shown with a segment being cut away such that the modified strain region 12 is visible as being hatched with parallel lines and the strain reactive structure 11 is visible as being hatched with crossing lines.

The work piece 10 has the overall height OAT. The modified strain region 12 consists of multiple cascades. The multiple cascades may overlap to a certain degree, which influences the average distortion saturation of the crystalline homogeneity within the modified strain region.

Incident articles enter the strain region surface as described under FIG. 1.

The strain induced in the strain regions 12, 34a-x represents the cumulative effect of many incident particles defined by a particle impacting rate integrated over an impacting period, which define together the particle dose.

Modified strain regions 12, 34a-x, which are free of opposing influences, have a static expansion that depends on:
1) the material of the work piece;
2) the incident particle type;
3) the incident particle dose;
4) the incident particle energy; and
5) the average impact angle.

Figure 3:
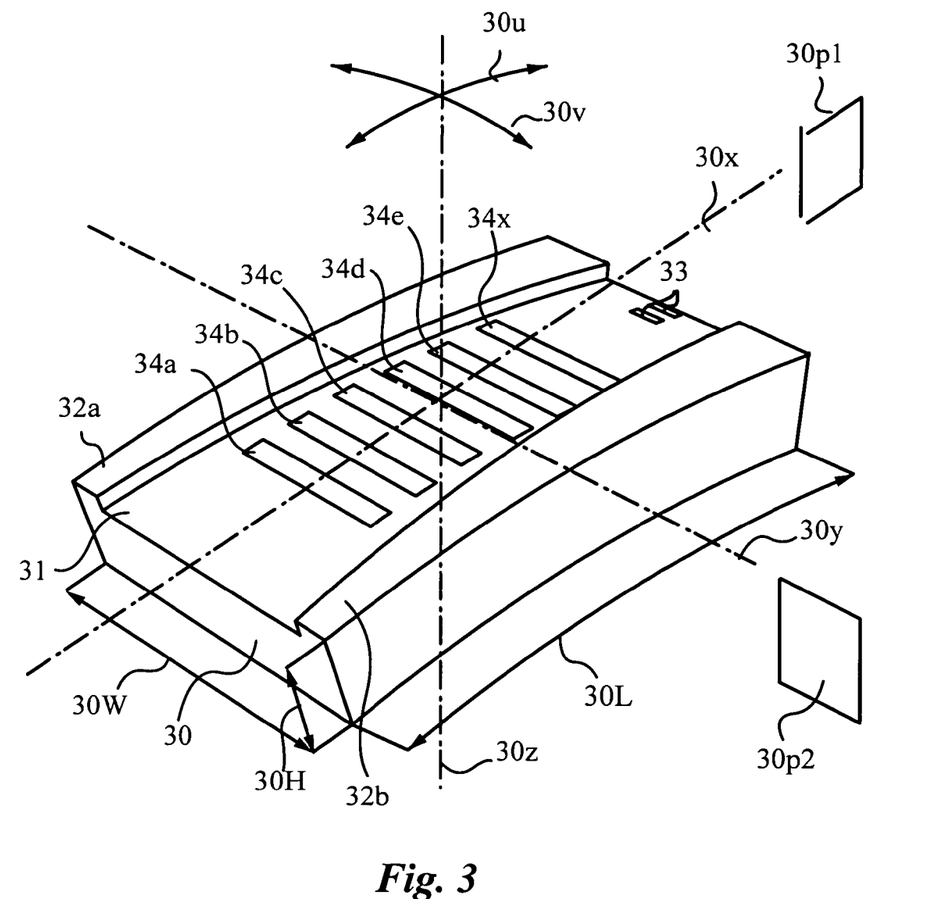
FIG. 3 shows a perspective view of a complex strain reactive structure with embedded modified strain regions.

The modified strain regions 12, 34a-x are in static interaction with the strain reactive structure 11, 30. As a result, the static expansion causes a tensile strain in the strain reactive structures 11, 30 and a compressive strain energy in the modified strain regions 12, 34a-x. The work piece deforms to the degree to which the compressive stress(es) balances the tensile stress(es) for given sum properties of the modified strain regions 12, 34a-x and the strain reactive structures 11, 30.

For the simplified example of FIG. 2, the work piece 10 experiences a wedge-like deformation that results in a convex curvature on its top surface. The top surface is for this example the same as the strain region surface. The convex curvature results in a maximum surface height CV.

Experiments performed with various particle types on rectangular profiles having a profile width PW of 1 mm, a profile length PL of 1.25 mm and an overall thickness OAT of 0.3 mm made from $TiC/Al_2O_3$ ceramic leads to the following exemplary results:

| Incident partic.: | Nitrogen | Argon | Helium |
|---|---|---|---|
| particle energy: | 0.16 MeV | 1.0 MeV | 0.5 MeV |
| particle dose: | 1E15/sqcm | 2E15/sqcm | 7.2E15/sqcm |
| max. surf. h. CV: | 3 nm | 16 nm | 5.6 nm |

In the simplified case visualized in FIG. 2, the deformation curvature achieved in a section of the work piece 10 is approximately proportional to the maximal depth SRD and proportional to the inversion of the second power of the overall height OAT.

FIG. 3 shows the modified strain regions 34a-x embedded in a strain reactive structure 30 in the exemplary complex form of a slider as it is used in hard disk drives. The strain reactive structure 30 has the slider length 30L, the slider width 30W and the slider height 30H. The modified strain regions 34a-x are shown in FIG. 3 as being embedded on the air-bearing surface 31. The modified strain regions 34a-x may be embedded at any other surface of the strain reactive structure 30 or on a combination of two or more surfaces. For the example of FIG. 3, the modified strain regions 34a-x are embedded on the air-bearing surface 31 to induce an elastic deformation of the strain reactive structure 30 resulting in a convex bending 3u, 3v of the air-bearing surface 31 as it is described under FIG. 2. The convex bending 30u has a first bending axis placed within the transverse plane 30p2. The convex bending 30v has a second bending axis placed within the longitudinal plane 30p1. For the example of FIG. 3 the longitudinal plane 30p1 is collinear with the longitudinal symmetry axis 30x and the vertical symmetry axis 30z. For the example of FIG. 3, the transverse plane 30p2 is parallel to the lateral symmetry axis 30y and the vertical symmetry axis 30z. It is noted that the bending of the strain reactive structures 12, 30 is not limited to any particular orientation. The compressive strain of the invention occurs uniformly unless specific shapes and materials for the modified strain regions 12, 34a-x and/or the strain reactive structures 12, 30 are used to create a distinctive and eventual orientated deformation. Thus, the sum properties define for a given irradiation the resulting deformation of the strain reactive structure 12, 30.

Primary shape influences on the deformation of the strain reactive structure 30 are, for instance, the three-dimensional features 32a, 32b of the air-bearing surface 31. Primary elasticity influences on the strain reactive structure 30 are exemplified by, for instance, the read/write head structures 33, which have a different material composition and thus different elastic properties. The three-dimensional features 32a, 32b are examples of primary shape influences that apply to the strain reactive structure 11. The read/write heads 33 are examples of primary elasticity influences that apply to the strain reactive structure 11. The primary shape and/or elasticity influences given for the features of a magnetic recording slider are stated solely for the purpose of general understanding without any claim of accuracy thereof.

Secondary shape influences and secondary elasticity influences apply to the modified strain regions 12, 34a-x and are comparable to the primary shape influences and diverging elasticity influences. Secondary shape influences may, for instance, be the shape of the modified strain regions 12, 34a-x, as well as cavities and/or protrusions within the modified strain regions 12, 34a-x. Secondary elasticity influences may, for instance, be different constituent materials with different elasticity within the modified strain regions 12, 34a-x. The secondary shape and/or elasticity influences given for the features of a magnetic recording slider are stated solely for the purpose of general understanding without any claim of accuracy thereof.

Figure 4:
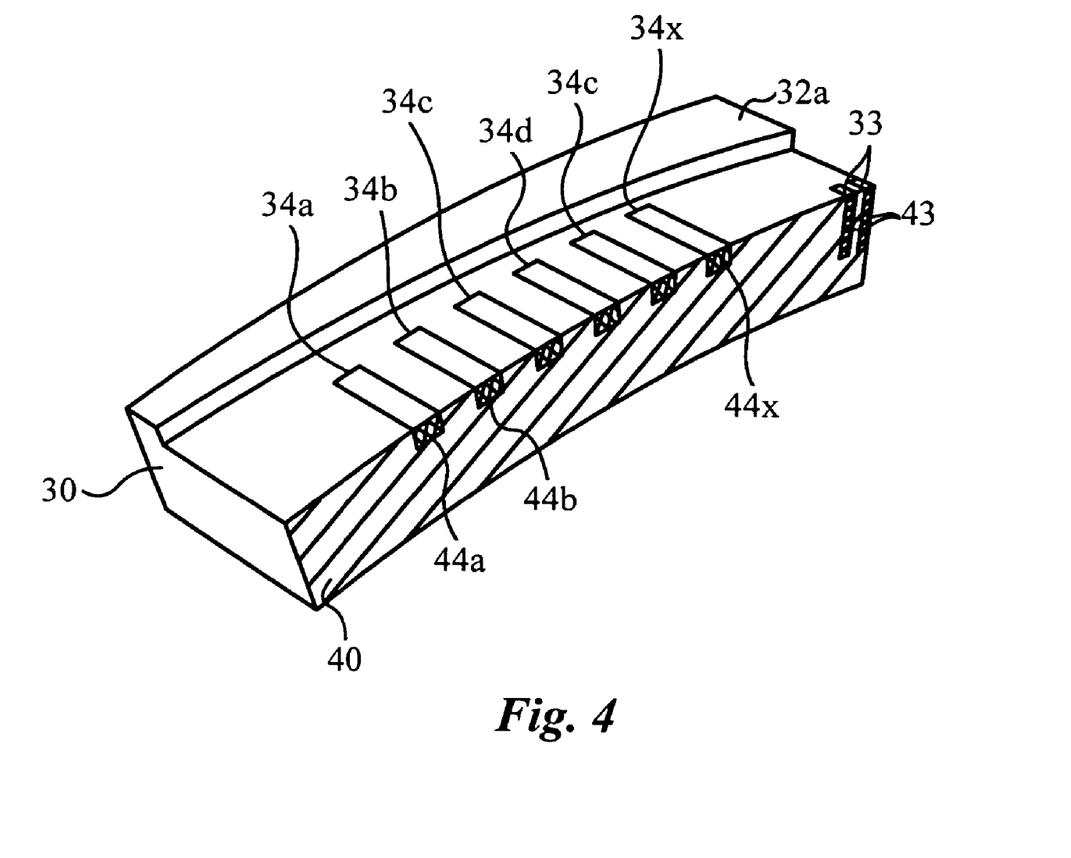
FIG. 4 shows a first perspective cut view of the complex strain reactive structure.

FIG. 4 shows a longitudinal cut section of the modified strain regions 34a-x and the strain reactive structure 30 along the longitudinal plane 30p1. As a result, the longitudinal strain sections 44a-x and the transverse reactive section 40 are visible. Shapes and elastic properties of the longitudinal strain sections 44a-x and the transverse reactive section 40 define specific longitudinal sum properties for the longitudinal cut section. The integral of the longitudinal sum properties over the lateral symmetry axis 30y define the convex bending 30v for a given strain energy induced into the modified strain regions 34a-x.

Figure 5:
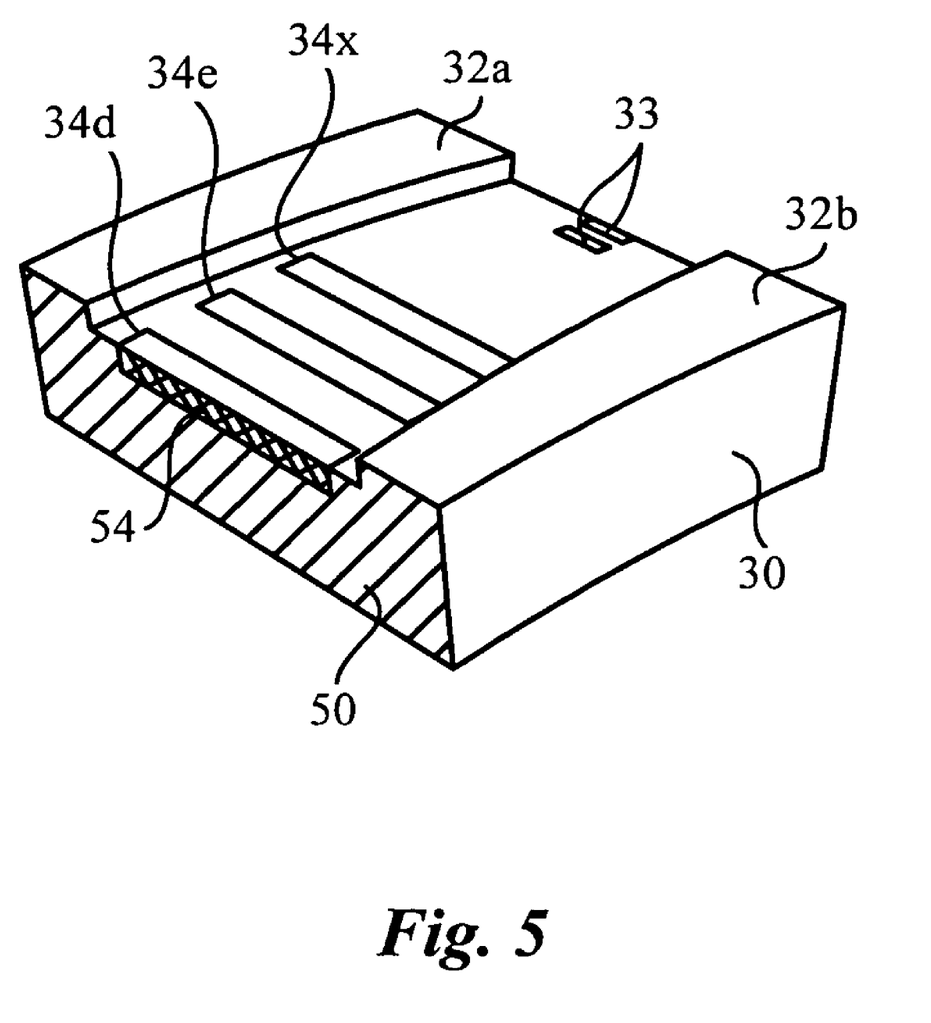
FIG. 5 shows a second perspective cut view of the complex strain reactive structure.

FIG. 5 shows a transverse cut section of the modified strain region 34d and the strain reactive structure 30 along the transverse plane 30p1. As a result, the later strain sections 54 and the transverse reactive section 50 are visible. Shapes and elastic properties of the longitudinal strain sections 44d and the transverse reactive section 40 define specific transverse sum properties for the transverse cut section. The integral of the transverse sum properties over the longitudinal symmetry axis 30x define the convex bending 30u for a given strain energy induced into the modified strain regions 34a-x.

From the two paragraphs above it is clear to one skilled in the art that any combination of shapes and elastic properties of modified strain regions and strain reactive structures may be selected to create a desired deformation at areas of work pieces or of complete work pieces. For instance, systematic curvature variations along a row of modified strain regions may be applied to a work piece and/or to areas of a work piece by combining a number of modified strain regions with dissimilar shapes that are defined in relation to the adjacent ones.

The following is a description of a photomasking process to change both the value of various curvatures and the amount of variation of these curvatures, applied to a row of recording head sliders. First, measurements of crown, camber and twist along the row at many points or slider positions are made. Masks, which allow the photoresist pattern generation are prepared, which can be used to expose some fraction of a row, say one-third of the row. These masks can have the same exposed area for each slider position or may have increasing or decreasing exposure areas along the length of the mask. For example, a simple mask would be one in which each slider position has a square to be opened in the photoresist, where each square is the same size. Two variations of this would be ones in which a line of squares is generated in which the size of the squares is increasing from one end to the other or is decreasing from one end to the other. In this way the area to be ion irradiated may be systematically changed over a third of the row at a time in a customized way. This technique may be used to adjust the average magnitude as well as the local variations in a particular parameter, such as crown. If a change in the overall amount of one curvature or another is needed, it is possible to use larger or smaller mask openings to allow larger or smaller areas to be exposed to the particle irradiation. These may be applied uniformly to the third of a row. If, however, the magnitude of desired crown shift increases from the starting point to the end point in the third of the row, then the size of the exposed area is increased using the appropriate mask. This allows considerably more ability to correct for localized and average curvature changes needed.

The above process may be coupled to the use of varied particle irradiation dose to a row or fraction of a row to yield an overall shift in curvature. For this case, local variation in curvature can be provided by the mask having the systematically changing exposure area over the third of a row under consideration, whereas the average curvature shift is controlled by the constant irradiation dose, which each slider in the row receives.

When equal longitudinal and transverse curvature adjustments are needed, areas of the mask opening are rectangular with dimensions proportional to the length and width of the work piece. If longitudinal and transverse curvature are to be altered differently, the rectangularly shaped opening in the photomask is modified so that a longer opening is made in the direction of curvature that needs more adjustment. Thus, it is relatively straight forward to have systematically varying resist pattern openings in the mask, which are constant in one dimension and varying in the opposing dimension. For example, if the crown shift needed for a third of a row is constant, but the camber shift needed increases from start to end, then the length of the exposure rectangle would remain roughly constant along the length of the slider, but its width would vary for each slider, increasing from start to end.

Implementation of twist control is somewhat more complicated, but may be improved with the same approach. Also, more complicated mask openings may be generated by multiple mask exposures. For this case, variations in one curvature correction may be applied somewhat independently from the other corrections.

The modified strain regions may be defined by a composite of thin film materials in close proximity to the surface. The thin film materials may be within the range of the irradiating particle but may react differently to a given particle irradiation. By exposing a combination of these thin film materials to a uniform particle irradiation, strain energies may be created, within the modified strain regions, which differ from that arising from the exposure of only one material by itself. For example, a sandwich of a material which responds to particle irradiation by generating a compressive stress may be patterned on a material which responds by generating a tensile stress. As a result, locally variable stress patterns could be defined by masking techniques associated with etching or deposition, rather than masking of the particle beam itself. These locally variable stress patterns may be categorized as an area specific strain condition.

In addition, an embedding condition between the modified strain regions $34a$-$x$ and the strain reactive structure 30 may be defined by an intermediated region partially or completely separating the modified strain regions $34a$-$x$ from the strain reactive structure 30. The intermediate region may be composed to impose a local attenuating affect on the strain induced by the modified strain regions $34a$-$x$. As a result, the embedding condition may influence the overall deformation of the strain reactive structure.

Primary, secondary shape and/or elasticity influences define the sum properties together with the eventual embedding condition and the eventual area specific strain conditions for a given particle irradiation.

It is noted that modified strain regions may be applied in combination with strain reactive structures for any purpose of dimensional precision adjustment. Modified strain regions may be created in polymers, silicon based glasses and/or amorphous alloys where the particle irradiation results in tensile stress.

To define the area extension of the modified strain regions 12, $34a$-$x$ various techniques may be applied, as they are known to those skilled in the art for conventional particle implantation.

Figure 6:
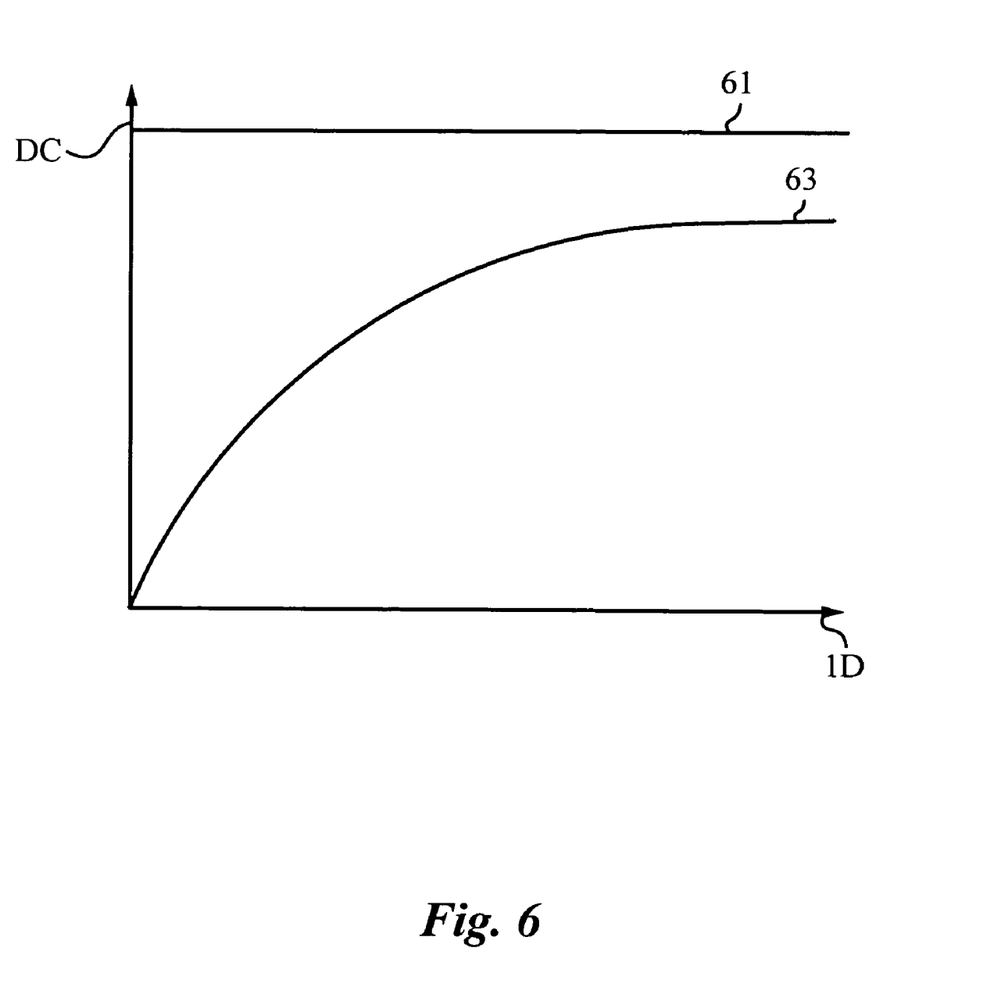
FIG. 6 shows a simplified graph that illustrates the dose dependent damage saturation of a modified strain region.

FIG. 6 shows a simplified graph that illustrates the damage saturation of a modified strain region. The graph shows on its vertical axis the sum strain energy DC of one of the modified strain regions 12, $34a$-$x$ and on its horizontal axis the sum particle dose ID induced on one of the modified strain regions 12, $34a$-$x$. The strain correlation curve 63 defines the correlation between the induced sum particle dose ID and the resulting sum strain energy DC for a given:

1) incident particle type,
2) incident particle dose,
3) average impact angle, and
4) sum properties.

The strain correlation curve 63 asymptotically approaches the theoretical maximum strain energy level 61. Since the sum particle dose ID has a time dependent magnitude, it is shown in correlation to the elapsed exposure time t of the lower graph. The elapsed exposure time t is the time during which the irradiation occurs.

It may be desirable to bring the maximum distortion saturation as close as possible to the maximum depth SRD in order to utilize as much as possible of the theoretically available compressive strain energy within a given modified strain region.

Irradiation distortions within modified strain regions are conventionally achieved in a depth range between a fraction of a micron to several microns. In some materials like, for instance, polymers the depth may range up to several tens of microns. Hence, modified strain regions are created at a quasi-surface level, where the created modified strain can be utilized most efficiently to perform a predetermined deformation of the strain reactive structure.

For the exemplary strain reactive structure 30, a static expansion and, for instance, the maximal depth OAT may be selected from a database, which may be created by a number of experiments. The database may be utilized to correct dimensional discrepancies of sliders fabricated on the row level. In a continuous fabrication process, a slider row may be measured for its dimensional discrepancies. The measurement result may be combined with the database to provide setup parameters for a dimensional correction by the use of the inventive particle irradiation.

Figure 7:
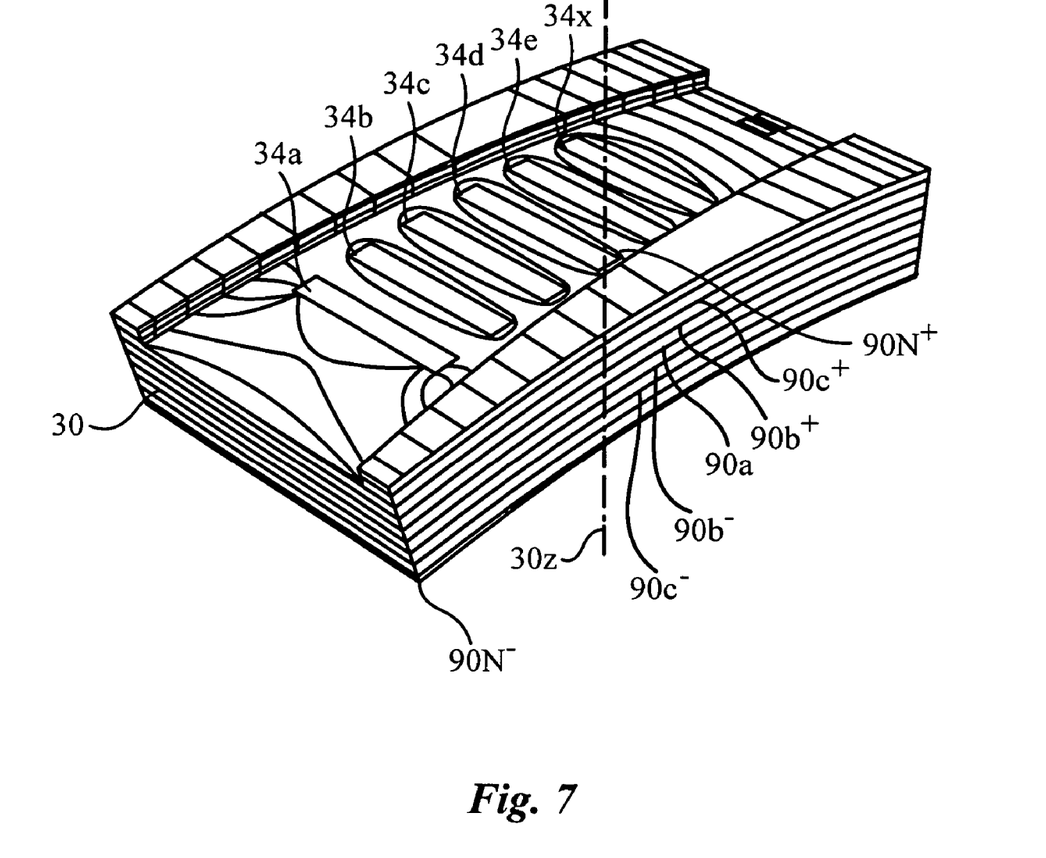
FIG. 7 shows an exemplary sum deformation analysis of the complex strain reactive structure of FIG. 3.

In FIG. 7, the sum deformation lines $90a$-90N+, $90a$-90N− show the resulting deformation of the strain reactive structure 30 for given sum properties and a given particle irradiation.

Figure 8:
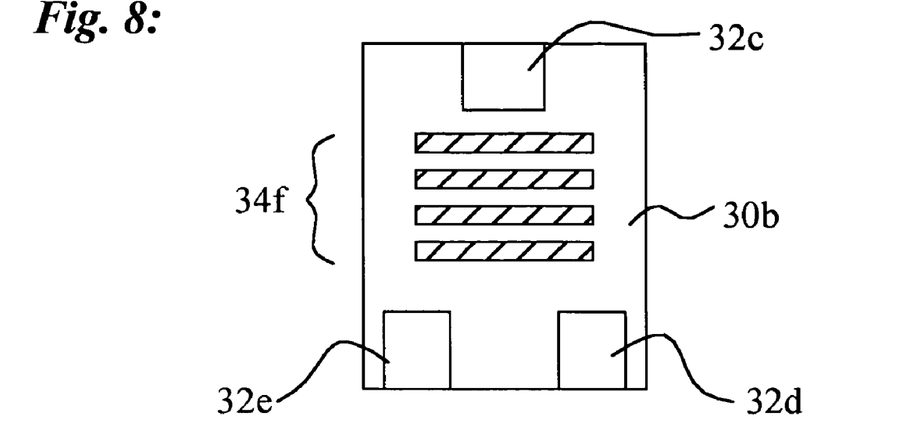
FIG. 8 shows an exemplary air bearing surface of a magnetic recording slider with crown inducing modified strain regions.
Figure 9:
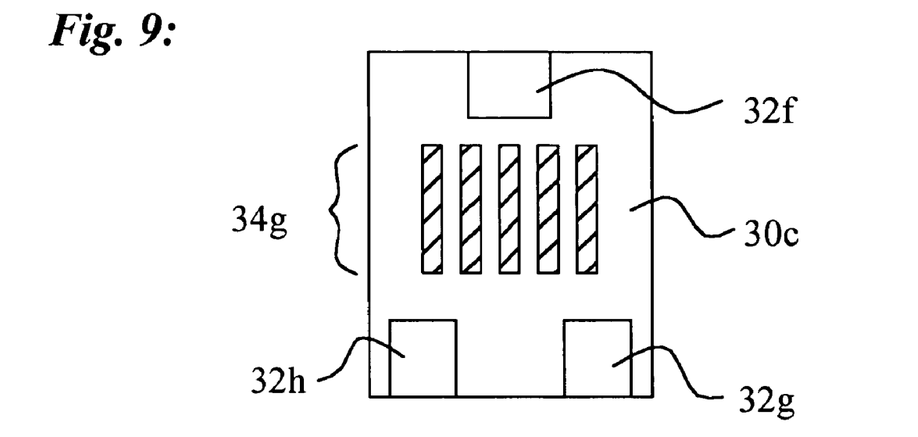
FIG. 9 shows an exemplary air bearing surface of a magnetic recording slider with camber inducing modified strain regions.
Figure 10:
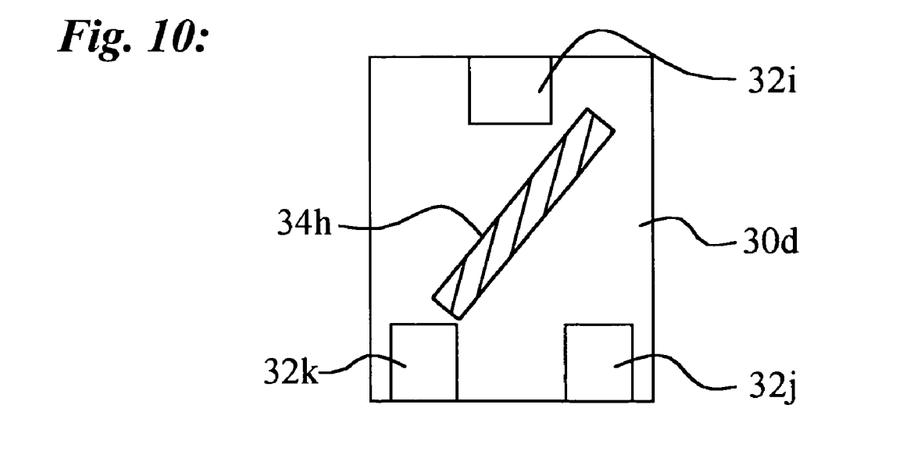
FIG. 10 shows an exemplary air bearing surface of a magnetic recording slider with a twist inducing modified strain region.

FIG. 8, 9, 10 show examples of modified strain regions $34f$-$h$ placed on air bearing surfaces $30b$-$d$.

In FIG. 8, the air bearing surface $30b$ has surface features $32c$-$e$. The modified strain regions $34f$ are placed parallel to each other with shapes chosen to cause predominantly crown bending of the magnetic recording slider.

In FIG. 9, the air bearing surface $30c$ has surface features $32f$-$h$. The modified strain regions $34g$ are placed parallel to each other with shapes chosen to cause predominantly camber bending of the magnetic recording slider.

In FIG. 10, the air bearing surface 30d has surface features 32i-k. The modified strain regions 34h is placed with shapes chosen to cause predominantly twist bending of the magnetic recording slider. Crown, camber and twist bend of magnetic recording sliders are well known to those skilled in the art.

Masks utilized to define modified strain regions may be separately applied or used from previous or following fabrication steps. For example, to fabricate features on the air bearing surface of a magnetic recording slider, air bearing masks are applied. These air bearing masks typically protect the sensitive read and write heads from damage during etching processes. The same masks used to protect the read and write heads may be utilized to protect the heads during the particle irradiation. In such a case, the modified strain region corresponds to an area created during a previous and/or following etching process. Air bearing features are fabricated, for instance, by the use of reactive ion etch technique or other etching techniques as is known to those skilled in the art. The photoresistive mask that is thereby utilized, may be utilized for the creation of the modified strain region, which in that case has the same area as the etched pocket previously created during the reactive ion etching.

It is clear to one skilled in the art that customized masks may be applied for individual and/or groups of parts.

Other types of used masks may include physical masks, which are simply held above the work piece. Physical masks are preferred when the modified strain region does not have to be precisely defined and/or sensitive parts of the work piece need to be protected, like for instance the read/write heads of a magnetic recording slider.

Preferably, the particle energy range for particle impacting is in the range between 0.1 and 2 MeV.

Preferably, the modified strain region depth is in the range between 0.1 and 2 μm.

The strain modification introduced to the modified strain regions is reversible by raising the temperature of the modified strain regions to levels, where the structure starts to rearrange. This may be intentionally utilized to introduce a reversible deformation of the strain reactive structure, where such thermal excursions are acceptable.

During the particle impacting the temperature also rises within the modified strain region. In the preferred embodiment, the particle impacting is performed sequentially and alternating with cooling periods to prevent unfavorable thermal rise above a critical recombination temperature.

Since particle beam generators are preferably operated with fixated parameters, the invention provides an interrupted exposure of dedicated modified strain region areas. The interrupted exposure may be accomplished by fixating a number of work pieces on a fixture such that the work pieces can be moved with their dedicated modified strain region areas through a particle beam. Such a fixture may for instance be a rotating cylinder with an outside fixating area. The fixating area may carry a number of work pieces and may rotate with a rotational speed that corresponds to:
- the particle dose;
- the particle energy; and
- the heat dissipation characteristic of the modified strain region.

The heat dissipation characteristic of the modified strain region sums all influences that contribute to the dissipation of the thermal energy created inside the work piece during the particle irradiation as is known to those skilled in the art.

To fabricate a number of varying modified strain regions on one fixating cylinder, the focused particle beam may be dynamically altered with a number of apertures that are alternatingly brought into the particle beam path.

The particle beam density may be dynamically altered by the use of a fixated aperture in combination with a beam deflector placed along the beam path prior to the fixated aperture. The beam deflector, as is known to those skilled in the art may be dynamically operated in a fashion that corresponds with the arranged work pieces and their dedicated modified strain regions. Dependent on the dynamic changing influence of the beam deflector, the particle beam is more or less focused at the fixated aperture and the particle dose passing through the aperture is altered. As a result, a number of work pieces moved through the particle beam defined in its section shape by the fixated aperture may be exposed to individually customized particle irradiation doses.

An interrupted exposure may also be accomplished by the used of an periodically opening and closing aperture, which periodically interrupts the particle beam.

A combination of at least two modified strain regions on two opposing surfaces of the strain reactive structure 30 may also induce a torsion deformation.

The examples stated in the above are stated for the preferred embodiment of the invention in which compressive strain is created in the modified strain regions. In an alternate embodiment of the present invention, the modified strain regions may be of an alternate material that shrinks as the result of particle impacting as described above. The shrinkage may result from a more space efficient structural arrangement initiated by the particle irradiation. Alternate materials may be, for instance, silica-based glasses.

Particle types used for the creation of altered strain may be but are not limited to ionized:
- Helium;
- Argon;
- Hydrogen;
- Carbon;
- Nitrogen;
- Boron;
- Oxygen;
- Neon.

The stress created in modified strain regions is typically static and persists for a predetermined lifetime. The lifetime is dependent on environmental influences like for instance temperature and/or other irradiation that may attenuate the induced strain energy over time.

It is clear to one skilled in the art that any particle charged and/or uncharged may be used in the present invention that provides properties known to cause a change in the modified strain regions resulting in strain energy as described in the above. Hence, particles used for in the present invention may be, for instance, ions, electrons, neutral atoms, subatomic particles and molecular structures.

Accordingly, the scope of the invention described in the specification above is set forth in the following claims and their legal equivalent:

What is claimed is:

1. A method for inducing a predetermined deformation on a structure, said method comprising the steps of:
   A) defining exposure areas on a surface of said structure;
   B) exposing said exposure areas to the impact of incident particles through particle irradiation to displace atoms through kinetic energy within said structure to create a modified strain region within said structure that expands due to the impact of the incident particles, said modified strain region is in static interaction with said structure to cause a compressive strain energy in said modified strain region and a tensile strain energy in said structure; and
   C) creating said predetermined deformation as a balancing condition of said compressive strain energy in said modified strain region and said tensile strain energy in said structure, resulting in a convex curvature on said surface.

2. The method of claim 1, wherein said structure is part of a disk drive slider.

3. The method of claim 2, wherein said surface comprises an air bearing surface of said slider.

4. The method of claim 1, wherein said modified strain region has a depth in the range between 0.1 and 2 μm.

5. The method of claim 1, wherein defining said exposure areas comprises applying a mask on said surface of said structure.

6. A method for deforming a structure, the method comprising:

defining exposure areas on a surface of said structure; and exposing said exposure areas to incident particles selected from the group consisting of ions, electrons, and neutral atoms to displace atoms through kinetic energy within said structure to create a modified strain region within said structure that expands due to impact of the incident particles, said modified strain region is in static interaction with said structure to cause a compressive strain energy in said modified strain region and a tensile strain energy in said structure which induces a convex curvature on said surface of said structure due to a balancing condition of said compressive strain energy in said modified strain region and said tensile strain energy in said structure.

7. The method of claim 6, wherein said structure is part of a disk drive slider.

8. The method of claim 7, wherein said surface comprises an air bearing surface of said slider.

9. The method of claim 6, wherein said modified strain region has a damage depth in the range between 0.1 and 2 μm.

10. The method of claim 6, wherein said particles are selected from the group consisting of ions of Helium, Argon, Hydrogen, Carbon, Nitrogen, Boron, Oxygen, and Neon.

11. The method of claim 6, wherein defining said exposure areas comprises disposing a mask between said structure and a source of said particles.

12. The method of claim 6, wherein defining said exposure areas comprises passing a beam of said particles through an aperture.

* * * * *

UNITED STATES PATENT AND TRADEMARK OFFICE
CERTIFICATE OF CORRECTION

PATENT NO. : 7,566,483 B2  Page 1 of 1
APPLICATION NO. : 10/861753
DATED : July 28, 2009
INVENTOR(S) : Baglin et al.

It is certified that error appears in the above-identified patent and that said Letters Patent is hereby corrected as shown below:

At column 6, line 52, please correct "Incident articles" to read "Incident particles".

At column 7, line 41, please correct "convex bending $3u$, $3v$" to read "convex bending $30u$, $30v$".

Signed and Sealed this

Twenty-fourth Day of November, 2009

David J. Kappos
*Director of the United States Patent and Trademark Office*